United States Patent [19]

Chung

[11] Patent Number: 5,760,509
[45] Date of Patent: Jun. 2, 1998

[54] SPINDLE MOTOR USING AN AIR BEARING

[75] Inventor: Young Ok Chung, Kyunggi-do, Rep. of Korea

[73] Assignee: Samsung Electro-Mechanics Co., Ltd., Suwon, Rep. of Korea

[21] Appl. No.: 687,182

[22] Filed: Jul. 25, 1996

[30] Foreign Application Priority Data

Jul. 28, 1995 [KR] Rep. of Korea ............... 1995-22818

[51] Int. Cl.[6] .................................................. H02K 7/08
[52] U.S. Cl. ........................ 310/90; 310/67 R; 310/61; 360/99.08; 360/99.04; 384/108
[58] Field of Search ........................ 384/109, 108, 384/113, 100; 310/90, 61, 67 R, 52, 58; 360/99.04, 99.08

[56] References Cited

U.S. PATENT DOCUMENTS

| | | | |
|---|---|---|---|
| 2,998,999 | 8/1961 | Morser et al. | 384/108 |
| 3,063,041 | 11/1962 | Quade et al. | 384/109 |
| 3,302,048 | 1/1967 | Gray | 384/108 |
| 3,351,394 | 11/1967 | Hooker | 384/108 |
| 3,494,675 | 2/1970 | Hold et al. | 384/108 |
| 3,639,791 | 2/1972 | Jankin | 310/90 |
| 3,721,479 | 3/1973 | Rasnick et al. | 384/109 |
| 4,095,855 | 6/1978 | Fox | 384/109 |
| 4,305,626 | 12/1981 | Schulz et al. | 384/109 |
| 4,318,572 | 3/1982 | Noha et al. | 384/108 |
| 4,734,606 | 3/1988 | Hajec | 310/90.5 |
| 5,120,139 | 6/1992 | Asada et al. | 384/113 |
| 5,246,294 | 9/1993 | Pan | 384/119 |
| 5,274,286 | 12/1993 | Yamamura | 310/67 R |
| 5,559,651 | 9/1996 | Grantz et al. | 360/99.08 |

FOREIGN PATENT DOCUMENTS

| | | | |
|---|---|---|---|
| 52-52054 | 4/1977 | Japan | 384/108 |
| 192555 | 3/1967 | U.S.S.R. | 384/108 |

*Primary Examiner*—Thomas M. Dougherty
*Assistant Examiner*—B. Mullins
*Attorney, Agent, or Firm*—Ladas & Parry

[57] ABSTRACT

A spindle motor using an hemispherical-type air bearing, wherein air circulation means is formed on the shaft inserted and fixed in the air bearing, so that air inflow to the air bearing and air circulation within the bearing are highly facilitated, whereby friction and wear phenomena between the hemispherical balls and the ball casing is reduced and noises are inhibited, and whereby the life span of the air bearing can be extended and the performance of the spindle motor itself can be enhanced.

2 Claims, 2 Drawing Sheets

1

SPINDLE MOTOR USING AN AIR BEARING

BACKGROUND OF THE INVENTION

1. Field of the Invention

The present invention relates to a spindle motor using a hemispherical-type air bearing (hereinafter referred to as an air bearing), wherein a shaft axially inserted through the air bearing is formed with air circulation means so that air smoothly circulates within the air bearing, whereby the life span of the air bearing can be extended and the performance of the spindle motor itself can be enhanced.

2. Description of the Prior Art

In general, spindle motors use an air bearing installed therein in order to enhance the performance of the motor and to maintain the purity of air contained within the air bearing set.

Such spindle motors using an air bearing, as shown in FIG. 1, comprise a hub 1 which is rotatably inserted into a housing 2 containing a stator 4, and magnets 5 which are mounted inside of the internal circumferential surface of the hub 3 to face the stator 4.

The hub 3 encompasses a hemispherical-type air bearing 6 and is supported on the housing 2 by a shaft 9 axially inserted through the air bearing 6.

The air bearing 6 is composed of two, i.e., upper and lower hemispherical balls 7 and a ball casing 8 for retaining the hemispherical balls 7. As the shaft 9 is inserted into an axial bore formed at the center of the hemispherical balls 7, the balls are fixed on the shaft 9 and the ball casing 8 is fixed on the internal surface of the hub 3.

A narrow gap G is formed between the hemispherical balls 7 and the ball casing 8.

The lower end of the shaft 9 is covered by a label 12 attached to the housing 2 and the upper end of the shaft is covered by the air bearing set 11 in order to maintain the purity of air contained within a hard disk drive set and to prevent in-flow of the external air.

If electric current is applied to the stator 4, the spindle motor 1 having a construction as explained above will generate driving forces by a number of N/S pole magnets 5, and thus the hub 3 will rotate in accordance with Fleming's Left Hand Law. Therefore, the hub 3 will smoothly rotate about the shaft 9 via the air bearing 6.

When the air bearing 6 rotates, however, friction is produced between the hemispherical balls 7 and the ball casing 8, since the hemispherical balls 7 and the ball casing 8 constituting the air bearing 6 contact each other before the bearing 6 rotates. The friction will continue for a while, since the upper and lower ends of the air bearing 6 are covered by the motor set 11 and the label 12, respectively, and thus air inflow into the narrow gap G and air circulation within the air bearing are inhibited.

If such friction exists, the air bearing 6 will be readily worn and the motor 1 itself cannot be smoothly operated. Therefore, there are problems that the life span of the air bearing 6 is extremely reduced and the motor 1 is likely to be over-loaded.

SUMMARY OF THE INVENTION

It is an object of the present invention to solve the problems which are involved in conventional spindle motors using a hemispherical-type air bearing, in particular to provide a spindle motor incorporating an air bearing which has a construction facilitating air inflow into the air bearing and air circulation within the bearing, whereby the life span of the air bearing can be extended and the performance of the spindle itself can be enhanced.

In order to achieve this object, the spindle motor in accordance with the present invention is provided with air circulation means on a shaft fitted into the air bearing, so that air flows into the air bearing and is circulated through the gap between hemispherical balls and a ball casing retaining the hemispherical balls.

Due to the features of the present invention, the friction of the air bearing encountered at the initial operation stage can be inhibited and the performance of the spindle motor can be enhanced.

BRIEF DESCRIPTION OF THE DRAWINGS

The above and other objects, features, and advantages of the present invention will become more apparent through the following description of the preferred embodiments of the present invention made with reference to the attached drawings in which.

DETAILED DESCRIPTION OF THE PREFERRED EMBODIMENT

Figure 3:
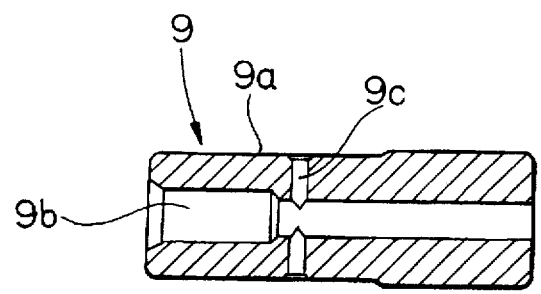
FIG. 3 is a cross-sectional view of the air bearing shaft in accordance with the present invention.
Figure 4:
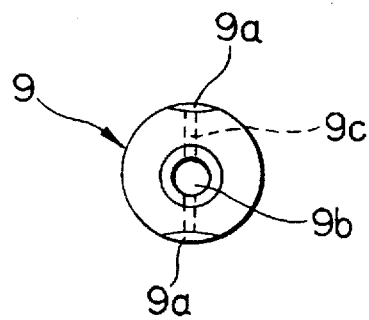
FIG. 4 is a left side view of FIG. 3.

As shown in FIGS. 3 and 4, air circulation means of the air bearing of the spindle motor in accordance with the present invention is formed by machining the shaft 9 to be inserted and fixed into the air bearing.

Figure 5:
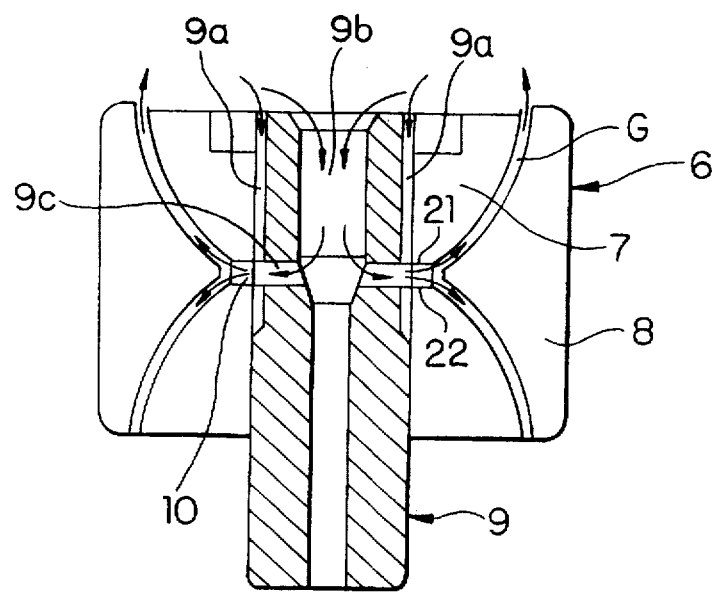
FIG. 5 is a cross-sectional view of the air bearing illustrating air flow caused by air circulation construction of the air bearing in accordance with the present invention.

First, a diametric bore 9c is formed in the shaft 9 to be connected and aligned with a clearance 10 between opposite flat surfaces 21, 22 of the hemispherical balls 7 as shown in FIG. 5.

By partially machining the external circumferential surface of the shaft 9 to have flat portions of a width and a length, lateral air gaps 9a are formed between the shaft 9 and the internal surface of an axial bore of the hemispherical balls receiving the shaft 9 in the assembled state thereof. These lateral air gaps 9a extend longitudinally beyond the diametric bore 9c. In addition, a vertical bore 9b is formed at the center portion of the shaft 9 and extends longitudinally therethrough.

The diametric bore 9c communicates, and aligns laterally, with the lateral air gaps 9a and also communicates with the vertical bore 9b. Therefore, the diametric bore 9c constitutes the air circulation means by itself alone or in combination with the lateral gaps 9a and the vertical bore 9b.

Figure 1:
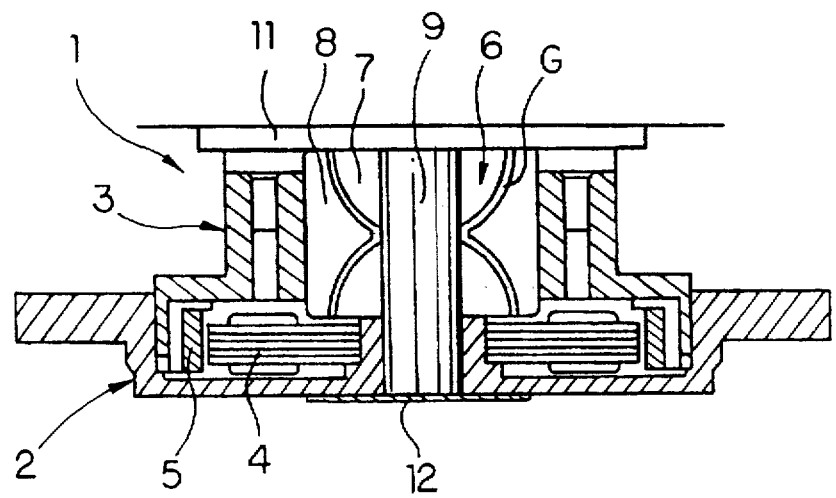
FIG. 1 is a cross-sectional view of a spindle motor illustrating air circulation within a conventional air bearing.
Figure 2:
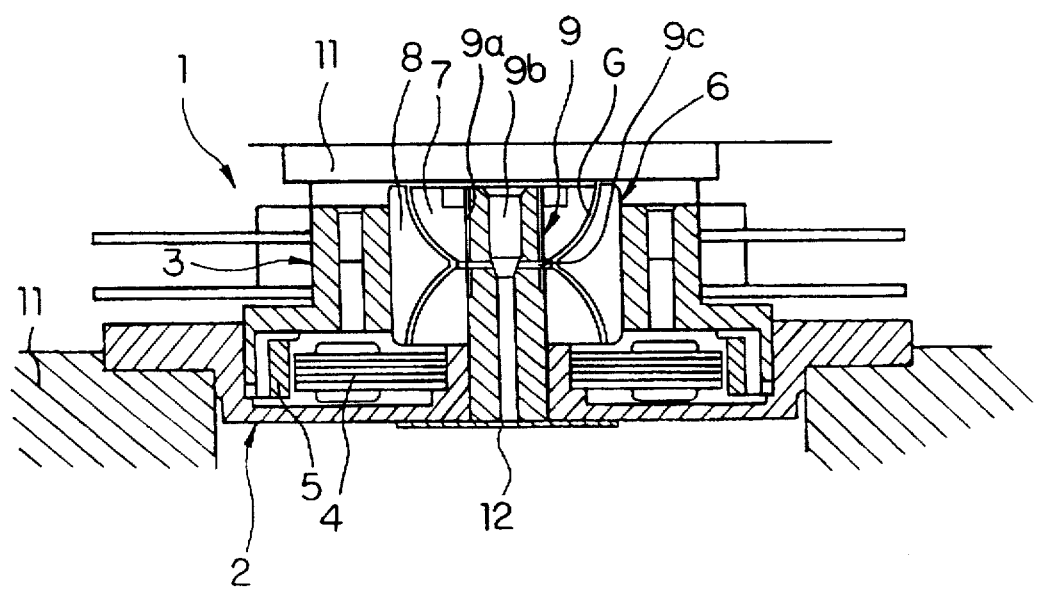
FIG. 2 is a cross-sectional view of the spindle motor incorporating air circulation construction in accordance with the present invention.

When the shaft 9, machined as explained in above, is fitted into the central bore of the air bearing 6 as shown in FIG. 2, the lateral air gaps 9a formed between both sides of the shaft and the internal surface of the central bore will provide vertical air in flow paths and the diametric bore 9c will be connected to the clearance 10 formed between two hemispherical balls 7 and 7.

Therefore, when the air bearing 6 is rotated together with the hub 3, as shown in FIGS. 2 to 5, a gap G is immediately created between the hemispherical balls 7 and the ball casing 8 which were previously in contact with each other and, thus makes it possible for the air bearing to smoothly rotate. This is because air, which could not have entered into the air bearing through only the narrow gap G, is readily entered and filled within the narrow gap G through the lateral air gaps 9a, the vertical bore 9b and, the diametric bore 9c formed in the shaft 9.

As can be seen from FIG. 5, air outside the air bearing 6 flows through the lateral air gaps 9a, the vertical bore 9b, and the diametric bore 9c formed in the shaft 9 in the directions indicated by the arrows, and the air diverges in two directions through the diametric bore 9c and flows out through the clearance 10 formed between the hemispherical balls 7, thereby being maintained within the gap G or flowing out through the gap G to the outside of the air bearing.

With the air circulation, a constant gap G is formed between the hemispherical balls 7 and the ball casing 8, so that the motor can smoothly rotate in the condition in which the hemispherical balls 7 and ball casing 8 are not in contact with each other. Therefore, friction and wear between the hemispherical balls 7 and the ball casing 8 is reduced, the life span of the air bearing 6 can be extended, and the performance of the spindle motor itself can be enhanced.

In accordance with the present invention, since air circulation means is formed on the shaft inserted and fixed in the air bearing, air inflow into the air bearing and air circulation within the bearing are highly facilitated, whereby friction and wear between the hemispherical balls and the ball casing are reduced and noise is inhibited, and whereby the life span of the air bearing can be extended and the performance of the spindle motor itself can be enhanced.

What is claimed is:

1. A spindle motor using an air bearing for a hard disk drive, said air bearing comprising:

a housing having a central cylindrical section, and a stator supported on a periphery of the cylindrical section;

a shaft having a lower end portion fixedly inserted into said cylindrical section of the housing;

a hemispherical-type air bearing coupled to an upper end portion of said shaft, said air bearing comprising upper and lower hemispherical balls mounted on said shaft and having flat surfaces facing one another to define a clearance therebetween, and a ball casing surrounding the hemispherical balls and forming a narrow gap therewith which is in communication with said clearance between the flat surfaces of said hemispherical balls;

a rotor connected to a peripheral surface of the ball casing, said rotor including magnets attached to an inner peripheral surface of a lower part of the rotor, said rotor having an upper part with an outer peripheral surface for support of a hard disk;

said shaft being provided with air circulation means defining a path connected to said clearance between said flat surfaces of the hemispherical balls for conveying air to said clearance via said shaft and provide natural air circulation to said narrow gap between the ball casing and said hemispherical balls, said air circulation means including a diametric bore extending through said shaft into communication with and laterally aligned with said clearance between said flat surfaces of said hemispherical balls, lateral air gaps formed between flat portions on an external surface of said shaft and an internal surface of said upper hemispherical ball facing said flat portions, said lateral air gaps extending along said shaft to connect with said diametric bore in said shaft, and an axial bore in said shaft extending through said shaft and communicating with said diametric bore.

2. An air bearing as claimed in claim 1, wherein said lateral air gaps extend longitudinally beyond said diametric bore between said flat surfaces on said external surface of said shaft and an internal surface of said lower hemispherical ball.

* * * * *